(No Model.)

H. A. MILES.
CASH INDICATOR AND REGISTER.

No. 408,036. Patented July 30, 1889.

WITNESSES:
Helen M. Fugan
K. Durfee

INVENTOR:
Harman A. Miles,
PER C. A. Shautley
ATTYS.

(No Model.)

H. A. MILES.
CASH INDICATOR AND REGISTER.

No. 408,036.

Patented July 30, 1889.

(No Model.) 5 Sheets—Sheet 4.

H. A. MILES.
CASH INDICATOR AND REGISTER.

No. 408,036. Patented July 30, 1889.

UNITED STATES PATENT OFFICE.

HARMON A. MILES, OF BOSTON, MASSACHUSETTS.

CASH INDICATOR AND REGISTER.

SPECIFICATION forming part of Letters Patent No. 408,036, dated July 30, 1889.

Application filed January 30, 1889. Serial No. 298,102. (No model.)

*To all whom it may concern:*

Be it known that I, HARMON A. MILES, of Boston, in the county of Suffolk, State of Massachusetts, have invented a certain new and useful Improvement in Cash-Registers, of which the following is a description sufficiently full, clear, and exact to enable any person skilled in the art or science to which said invention appertains to make and use the same, reference being had to the accompanying drawings, forming part of this specification, in which—

Fig. 6, an enlarged vertical longitudinal section of the adding-wheels; Fig. 7, a vertical section taken on line $x\ x$ in Fig. 6, the wheels being shown in side elevation looking in the direction of arrow 3; Fig. 8, a like view on line $y\ y$, looking in the direction of arrow 2 in Fig. 6; Fig. 9, a sectional view illustrating certain details of construction.

Like letters and figures of reference indicate corresponding parts in the different figures of the drawings.

My invention relates especially to that class of cash-registers which automatically indicate the total amount of the sales, being designed as an improvement on the invention described in Letters Patent of the United States granted to me August 7, 1888, and numbered 387,433; and it consists in certain novel features, as hereinafter fully set forth and claimed, the object being to produce a simpler, cheaper, and more effective device of this character than is now in ordinary use.

The nature and operation of the improvement will be readily understood by all conversant with such matters from the following explanation.

Figures 3, 5:
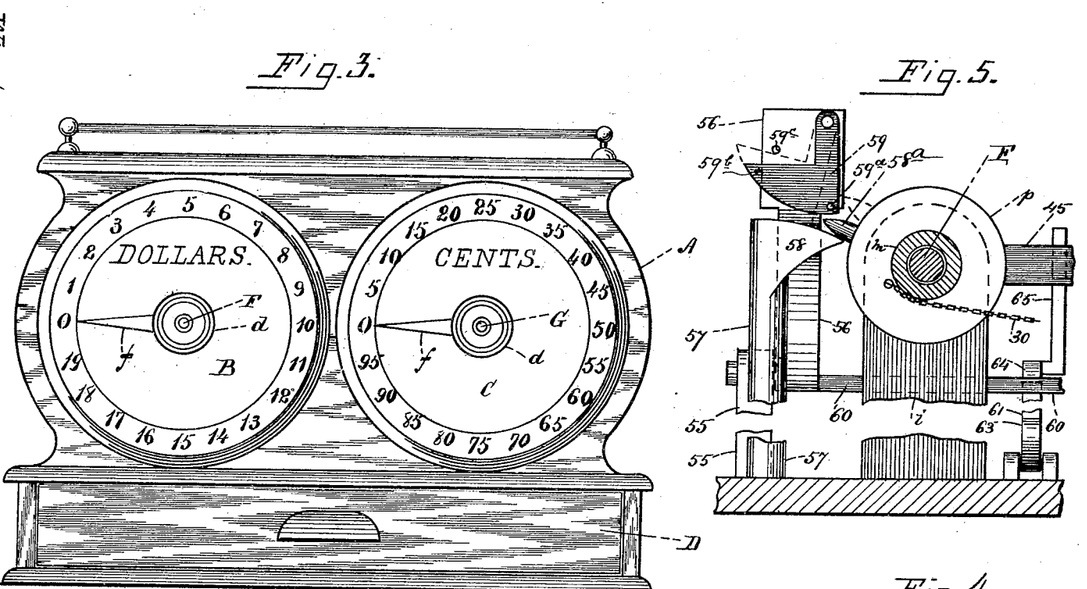
Fig. 3, a front elevation of the case.
Fig. 5, a vertical transverse section taken on line $w\ w$ in Fig. 4.

In the drawings, A represents the case, B C the dials, and D the cash-drawer. The case is constructed of any ornamental form desired, the drawer D being fitted to slide in a drawer-case E in the lower part thereof. The dials B C are affixed to the front of the case above the drawer and are preferably circular in form. The dial B is employed to indicate the dollars of a sale and is provided peripherally with numerals from naught to nineteen. The dial C indicates the amount in cents, and is provided in like manner with numerals, beginning with naught, followed consecutively with every fifth numeral to ninety-five, inclusive, as shown in Fig. 3. A horizontally-arranged rotating shaft F passes centrally through the dial B, being journaled in standards $b\ g\ h\ i\ j$, secured within the case, said shaft being provided on its forward end with a knob or hand-wheel $d$. A horizontally-arranged shaft G passes centrally through the dial C, being journaled in similar standards $b\ g\ h\ i\ j$, and provided in like manner with a knob $d$.

As the mechanism disposed on the shafts F G and their operation is practically the same, a description of the shaft G is deemed sufficient.

Figure 4:
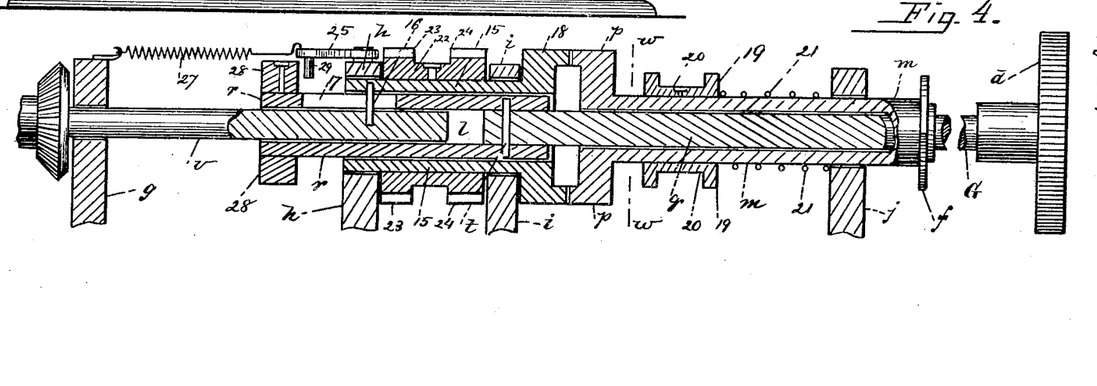
Fig. 4, an enlarged sectional view of one of the shafts removed.
Figures 10, 11:
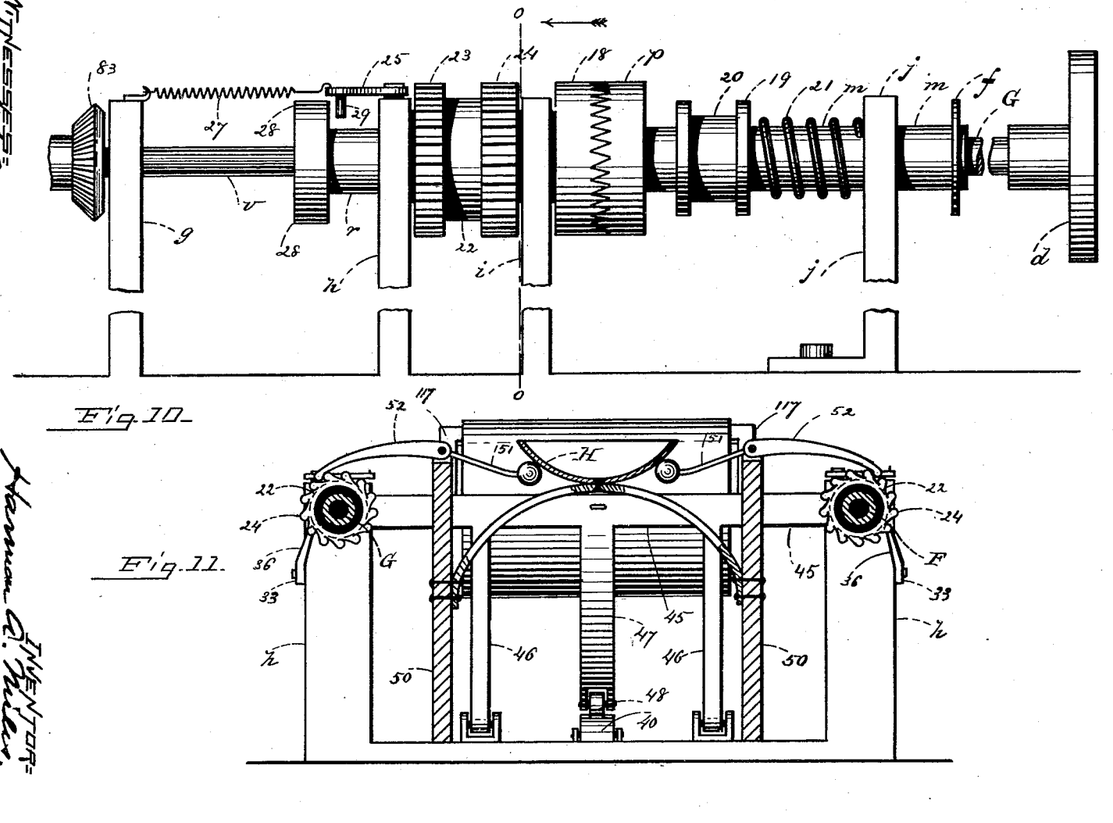
Fig. 10 is a detached view in side elevation of one of the shafts F or G and the mechanism carried thereon.
Fig. 11 is a vertical longitudinal section of a portion of the machine on line 11 11 of Fig. 1.

The shafts F G are broken at $l$, (see Fig. 4,) and loosely disposed on the respective forward sections $q$ thereof is a sleeve $m$, the forward end of which bears in the standard $j$ and carries the index-fingers $f$ of the dials. On the opposite end of said sleeve is formed a crown-gear $p$. On the rear end of the section $q$ of the shaft a sleeve $r$ is secured by a pin $t$, said sleeve receiving the forward end of the rear section $v$ of said shaft, upon which it is fitted to slide longitudinally, as shown in Fig. 4. A sleeve 15 is disposed on the sleeve $r$ and is fitted to revolve in the standards $h\ i$, said sleeve 15 being secured to the shaft-section $v$ by a pin 16, passing through a longitudinal slot 17 in the sleeve $r$. On the forward end of the sleeve 15 is formed a crown-gear 18, adapted to intermesh with the gear $p$ on the sleeve $m$, said gears forming a clutch, the purpose of which is hereinafter set forth. On the sleeve $m$ is secured a ring 19, provided with an annular groove 20, and disposed around said sleeve between said ring and the standard $j$ there is a coiled spring 21, which acts expansively to hold the gear $p$ in engagement with the gear 18. Secured to the sleeve 15 between the standards $h$ and $i$ there is a short sleeve or hub 22, having toothed flanges 23 and 24, the teeth of the latter being in the form of ratchet-teeth, as shown in Fig. 11, and pivoted to the upper end of the standard $h$ there is a horizontally-arranged lever 25, provided on its free end with an arm 26, (see Fig. 1,) adapted to engage the teeth of the flange 23 and thereby prevent the sleeve 15 from being rotated. A coiled spring 27 connects the free end of said lever with the standard $g$ and acts contractively to disengage the lever-arm 26 from the teeth of said flange. On the rear end of the sleeve $r$ is secured an annular flange or bunter 28, a stud 29 (see Fig. 4) projecting downward from the lever 25 (see Fig. 1) in position to be engaged by said bunter when said sleeve $r$ is drawn forward on the shaft-section $v$, thereby forcing the lever-arm 26 into engagement with the toothed flange 23, as described.

A chain 30 (see Fig. 1) is secured by one end to each crown-gear $p$ and is extended longitudinally across the case A, its other end being secured by a coiled spring 31 to the end wall of said casing, said spring acting contractively to return the sleeves $m$ into position after being rotated and the crown-gears disengaged, as hereinafter described.

A horizontally-arranged bar 33 (see Figs. 2 and 1) is mounted by means of slots 34 therein on screws 35 in the standards $b$ $h$, said bar being provided on its forward end with an upwardly-projecting arm 36 in position to engage the teeth of the flange 23 on the gear 22 when said bar is moved. A vertical arm 37 projects from the bar 33 into the path of the bunter 28 at the rear thereof, and a similar arm 38 projects in front of said bunter, their purpose being to actuate said bar when the sleeve $r$ is moved longitudinally on the shaft-section $v$. A retaining-pawl 40 (see Fig. 2) is pivoted within the case, its long arm projecting downward through an opening 41 in the top of the drawer-casing and being provided with a hook 42, which engages the back partition of the drawer D and secures it in its casing. A spring 43 is coiled around a vertical rod 44 at the rear of the drawer-casing, its ends respectively engaging the rear wall thereof and said drawer, said spring acting torsionally to force the drawer out of its casing when released from the pawl 40. A horizontally-arranged bar 45 (see Figs. 1, 2, and 11) is secured to the upper ends of two vertically-arranged pivoted standards 46, the ends of said bar projecting behind the bunters 28 in position to be engaged thereby. Secured centrally to the bar 45 is a downwardly and rearwardly projecting curved arm 47, (see Figs. 2 and 11,) provided with a roller 48 in its lower end in engagement with the short arm of the retaining-pawl 40, the purpose of said arm being to release the drawer D from said pawl when the bunters 28 are moved rearwardly. A chain and spring 49 connects the bar 45 with the front of the case A and returns it into position after having been moved by the bunters. A bell H is disposed centrally within the case A, and pivoted in the top of a standard 50 at each side of said bell there is a hammer 51. A retaining-pawl 52 is secured to each hammer 51, its free end resting on the flange 24 of the sleeve 22. As a shaft F or G is rotated from left to right to indicate a sale the end of the pawl 52 will slip over a tooth of the flange 24 and cause its hammer 51 to strike the bell as each tooth is passed. The pawl 52 prevents said shafts from being rotated in the opposite direction or from right to left by engaging the teeth of said flange, as shown in Figs. 1 and 11.

Figure 1:
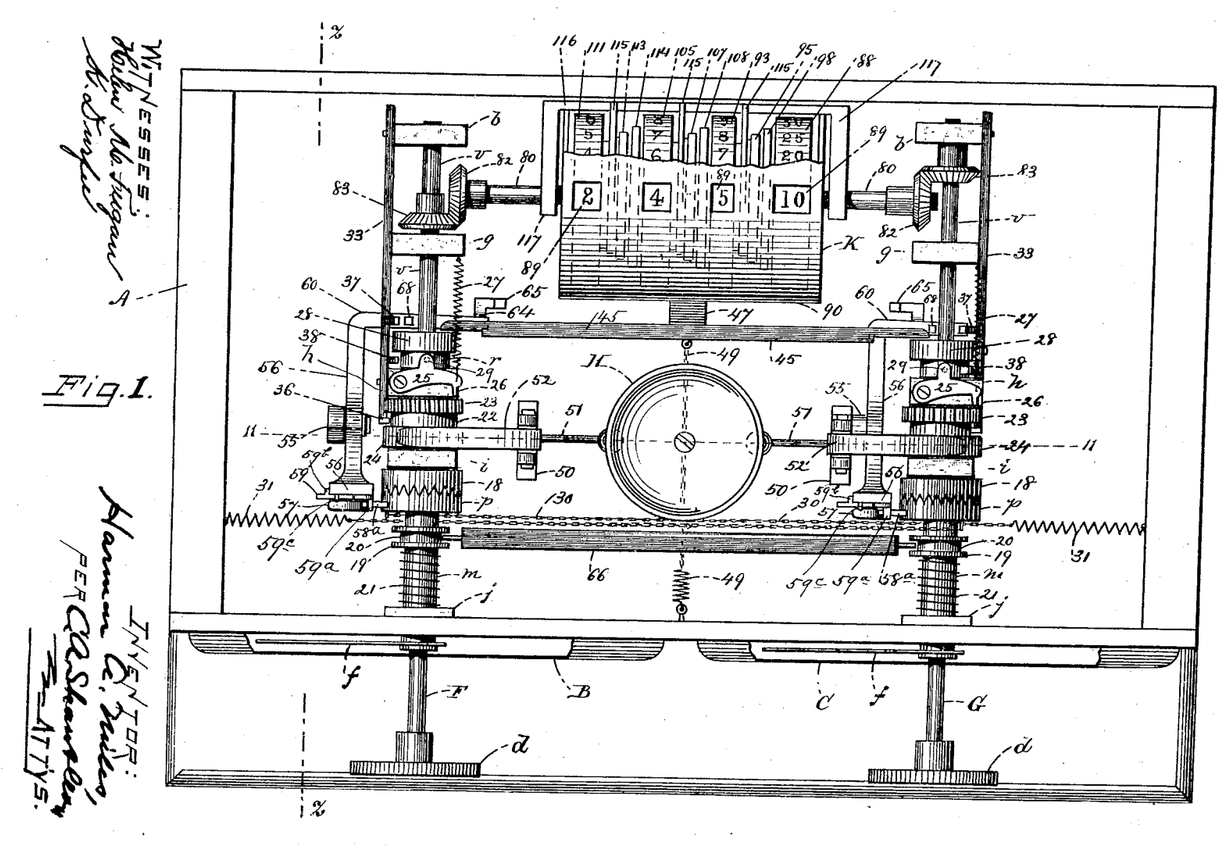
Figure 1 is a top plan view of my improved cash-register, the top of the case being removed.
Figure 2:
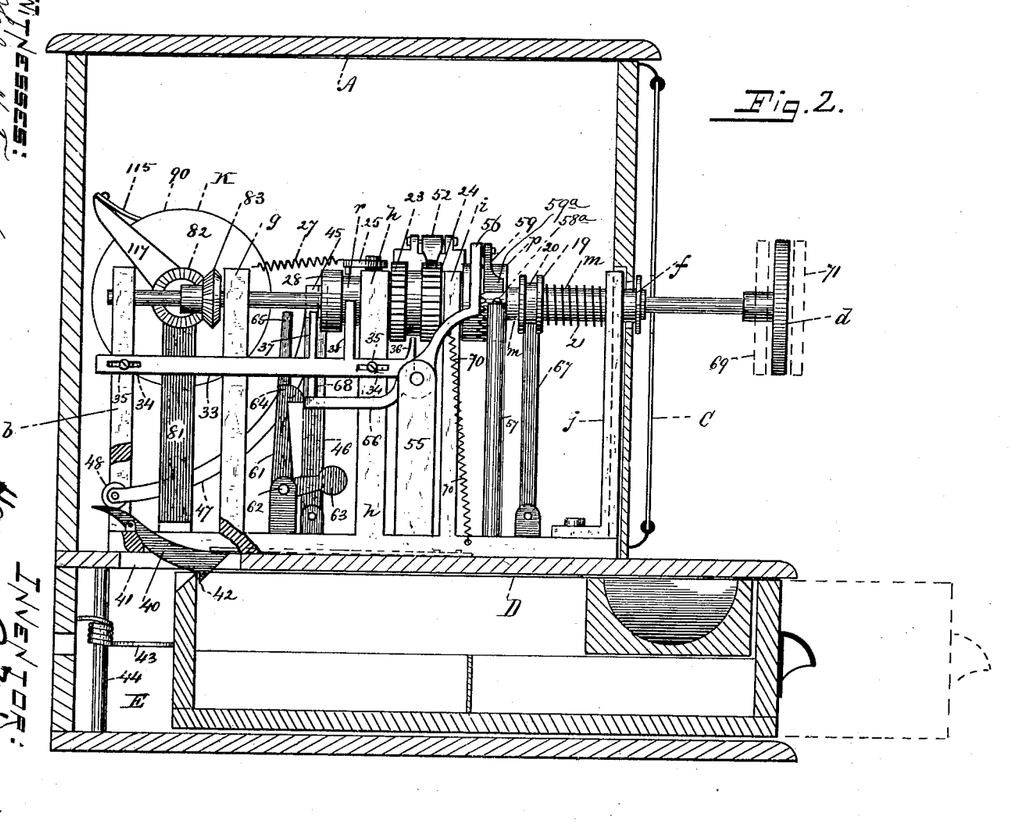
Fig. 2, a vertical transverse section taken on the line $z\ z$ in Fig. 1.

A vertical standard 55 is disposed at each end of the case A opposite the sleeve 22, and a bent rod 56 is centrally pivoted in the top of said standards, as shown in Figs. 1 and 2. The upper end of the rod 56 is opposite the crown-gears 18 and $p$. A vertically-arranged post 57 (see Figs. 1, 2, and 5) is disposed near each crown-gear $p$ and provided at its top with a beveled projection 58, extending toward the plain periphery of said gear in position to be engaged by pin $58^a$, extending radially from said periphery, and serve as a stop to prevent said gear from being rotated too far.

On the end of the rod 56, directly above the stop 58, is suspended a pivoted plate 59, having a forwardly-projecting pin $59^a$, adapted to be engaged by the pin $58^a$ as the gear $p$ is revolved from left to right and elevate said rod. The outer end of the pivoted plate is provided with a rearwardly-projecting stop-pin $59^b$, which engages one side of the rod 56 and serves as a stop to hold the pivoted plate in its normal position, as shown in Fig. 5. The front face of the rod 56 is provided with a stop-pin $59^c$, which arrests the movement of the pivoted plate when the latter is swung on its pivot into the position indicated in dotted lines in Fig. 5 by the action of the pin $58^a$ when the crown-gear $p$ is turned from right to left.

A horizontally-arranged arm 60 (see Figs. 1 and 9) projects at right angles from the rear or lower end of the rod 56 toward the center of the case. On said arm 60 is secured a vertically-arranged bar 68, (see Fig. 9,) which projects into the path of the bunter 28, serving as a stop to prevent said bunters from being forced inward until said arm is lowered. A lever 61 is pivoted in standards 62, (see Fig. 2,) and is provided with a counterbalance-weight 63 on one arm and a head or latch 64 on its opposite vertical arm, said latch being adapted to engage and retain the arm 60 of the rod 56 when depressed by the pin 58 on the crown-gear $p$, as described.

From the latch 64 (see Figs. 1 and 5) an arm 65 projects vertically into the path of the drawer-releasing bar 45 to enable said latch to be disengaged from the arm 60 when the bar 45 is moved to open the drawer.

A longitudinally-arranged rod 66 (see Fig. 1) is secured to the upper ends of two pivoted vertical bars 67, (see Fig. 2,) the ends of said rod projecting into the grooves of the rings 19 on the sleeves $m$, whereby said sleeves may be made to slide simultaneously on their respective shafts.

The operation of the shafts F G and the mechanism disposed thereon is as follows: The knob $d$ being turned from left to right rotates the shaft-section $q$, which being pinned to the sleeve $r$, and said sleeve prevented from revolving on the shaft-section $v$ by the pin 16, causes said section to rotate simultaneously. The sleeve 15 being secured by the pin 16 to the shaft-section $v$, and its crown-gear 18 intermeshed with the gear $p$ on the sleeve $m$, which carries the index-finger $f$, causes said finger to move as the knob is turned until it points to the numeral on the dial indicating the amount of the sale. The pin $58^a$ on the gear $p$ engaged the lower edge of the pivoted plate 59 or the pin $59^a$ therein as the knob began to turn, and caused the lifting of that end of the pivoted rod 56 to which the plate is pivoted and the lowering of the opposite end to which the arm 60 is attached. This lowering of the arm 60 caused the vertical rod 68 thereon to be depressed and removed from the path of the bunters 28. The weighted arm 63 of the lever 61 now causes the latch 64 on said lever to fall onto and secure the arm 60 in its depressed position. The sale having thus been displayed or indicated upon the dial to open the drawer D, the knob $d$ is forced inward into the position shown by dotted lines 69 in Fig. 2. This forces the shaft-section $q$ longitudinally through the sleeve $m$ and causes the sleeve $r$, secured to said section, to slide in like manner on the shaft-section $v$. The bunter 28 is thus forced into engagement with the horizontal releasing-bar 45, driving said bar rearward and the roll 48 on the rod 47 into engagement with the short arm of the retaining pawl 40, thereby elevating its long arm and releasing the drawer therefrom, which is immediately thrown from its casing by the spring 43. The bunter, as it was thus moved to engage the releasing-bar 45, at the same time engaged the vertical arm 37 on the bar 33, forcing said bar backward until its arm 36 entered the teeth of the flange 23, acting as a stop to prevent the knob from being turned while the drawer is open. The releasing-bar 45, in its backward movement described, engaged the vertical arm 65, attached to the latch 64, and swung back said latch, releasing the arm 60 of the pivoted rod 56 from the latch 64. A coiled spring 70, (see Fig. 2,) connecting the upper arm of said rod with the bottom of the case, returns the rod to its original position, its arm 68 being again projected into the path of the bunter 28 to prevent it from being moved rearward until the shaft is again revolved. The drawer being closed again, the knob $d$ is drawn out into the position shown by dotted lines 71 in Fig. 2, causing the sleeve $r$ to slide forward on the shaft-section $v$ and the bunter 28 to engage the vertical arm 38 on the bar 33, driving it forward and disengaging the stop 36 from the teeth of the flange 23. At the same time the bunter engaged the downwardly-projecting rod 29 on the lever 25, forcing its arm 26 into engagement with the teeth of said flange and preventing the knob from being rotated as the shaft is being drawn out. The forward end of the sleeve $r$ when withdrawn, as described, engages the inner face of the crown-gear $p$, Fig. 4, and disengages it from its companion gear 18, leaving it loose on the shaft-section $q$. The chain 30, having been wound upon the sleeve $m$ as it was revolved while indicating the sale, is unwound by the force of its spring 31 and causes said sleeve to revolve from right to left, carrying with it the index-finger $f$, which is stopped at the naught by the pin 58 on the gear $p$ meeting the stop 57. The knob being released, the spring 21 at once intermeshes the gears $p$ and 18 again, and the device is in position to indicate another sale. The spring 27 at once returns the lever 25 to its original position as soon as its arm 29 is released from the bunter 28.

It will be seen that the vertical arm 68 on the rod 56 prevents the bunter from being moved to open the drawer until the index-finger is revolved to indicate a sale. The stop 36 prevents the knob from being rotated in either direction while the drawer is open, and the lever 25 prevents the knob from being accidentally rotated during the process of disengaging the clutch to get the index-finger back to the naught and thus register a greater amount than desired.

The dials as illustrated are arranged for five-cent sales; but it will be understood that by subdividing the spaces on the dial C it may be made to indicate smaller amounts.

The number of teeth in the flanges 24 of the gear 22 corresponds with the number of spaces on the dial, there being twenty in the gear shown. As the teeth pass under the pawl 52 it causes the hammer 51 to strike the bell at each space passed by the index-finger.

Should a sale amount to more than one dollar, the knob of the dial B is turned until its index-finger shows the amount in dollars and the knob of the dial C turned in like manner to indicate the cents of the sale exceeding the dollar. By withdrawing either knob, as described, the bar 66 will cause both gears $p$ to be simultaneously separated from their companion gears and both index-fingers to return at the same time to the naught, thus rendering it impossible for the operator to leave the finger of one dial pointing at a figure other than naught and register a portion only of the amount of the sale by the finger of the other dial.

Figures 6, 7, 8, 9:
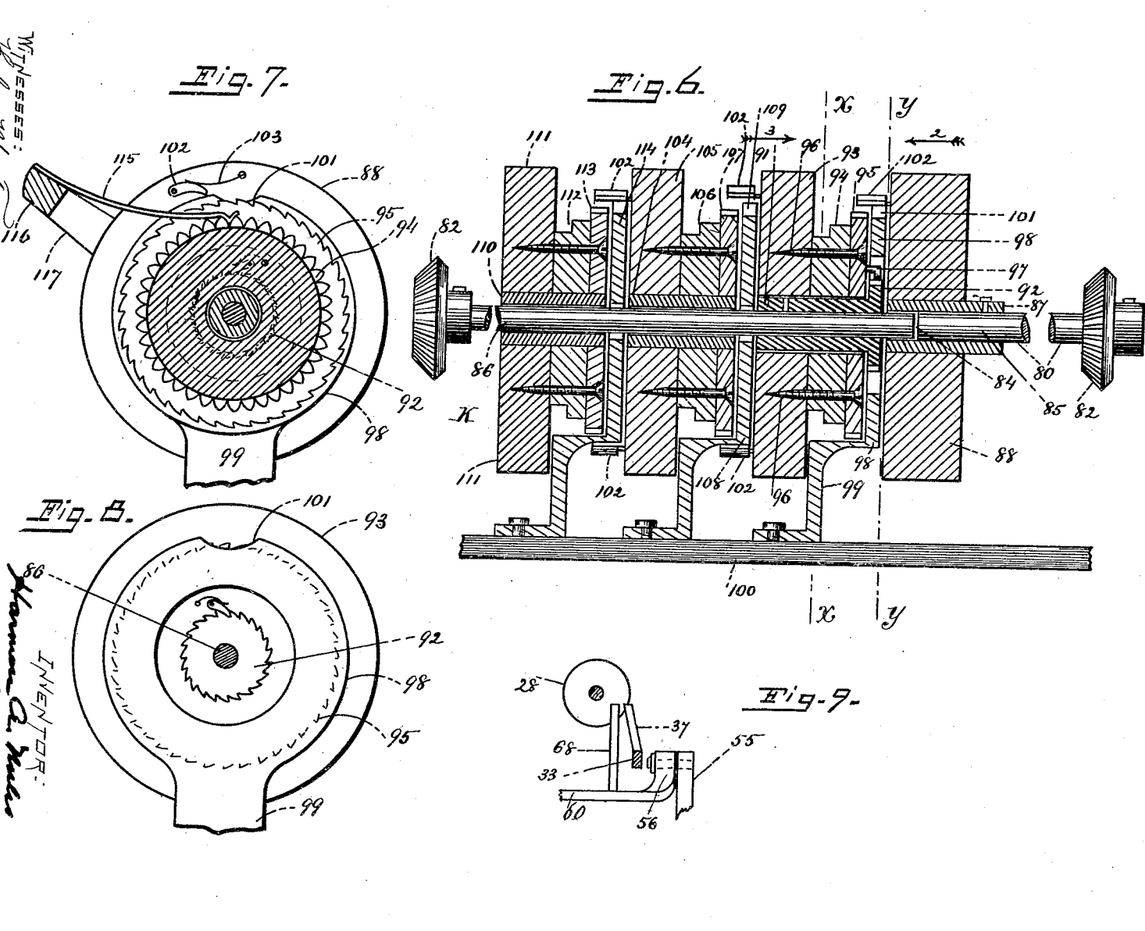

An adding device K, which registers and displays in rotation the gross amount of the sales at any moment, is disposed within the case at the rear, and is operated by the shafts as they are rotated, the construction of said device being as follows: A horizontal shaft 80 (see Figs. 1, 2, and 6) is journaled within the case in standards 81 between the shafts F and G, and is provided at each end with a beveled gear 82, which intermeshes with a like gear 83 on the adjacent main shafts. The shaft 80 is divided at 84 (see Fig. 6) into sections 85 and 86. On the section 85, which is adjacent to the shaft G, is secured a sleeve 87, the adjacent end of the shaft-section 86 revolving in said sleeve. To the sleeve 87 is secured a circular block or wheel 88, which is provided on its periphery with numerals corresponding to the numerals on the dial C— viz., every fifth numeral from naught to ninety-five, inclusive. The wheel 88 revolves a like distance with the shaft G and shows a numeral through a slot 89 in a cap-plate or cover 90 (see Fig. 1) of the adding device, which corresponds with the number indicated by the finger on the dial C, and shows the cents of the gross amount of the sales. A sleeve 91 is secured to the shaft-section 86, Fig. 6, and is provided on its end adjacent to the wheel 88 with a ratchet-wheel 92. (See Fig. 8.) A wheel 93 is secured to the opposite end of the sleeve 91 and bears on its periphery twenty numerals, being two sets of ten numerals from naught to nine, inclusive, arranged consecutively. The wheel 93 is employed to indicate the units in dollars of the gross amount. On the sleeve 91, adjacent to the wheel 93, is disposed an oval-toothed ratchet 94, and between it and the ratchet 92 is disposed a ratchet 95, the teeth of which point in a direction opposite to those of the ratchet 92, as shown in Fig. 7. The ratchets 94 and 95 are secured to the wheel 93 by screws 96. A pallet 97 is pivoted to the outer face of the ratchet 95, its point being in engagement with the teeth of the ratchet-wheel 92. A circular partition-plate 98 is disposed between the ratchet 95 and wheel 88, said plate inclosing the ratchet 92, and being provided with an arm 99, by which it is secured to a cross-bar 100, fastened to the standards 81. The partition 98 is slightly greater in diameter than the ratchet 95, (see Fig. 7,) and is provided centrally at the top with a peripheral groove 101 of sufficient depth to expose one tooth of said ratchet. A pawl 102 is pivoted to the inner face of the wheel 88, and is held in engagement with the periphery of the partition 97 by a spring 103, whereby it is forced into the groove 101, engaging the ratchet 95 and moving it the distance of one tooth at each complete revolution of the wheel 88. A sleeve 104 is fitted to revolve in the shaft-section 86, and secured to said sleeve there is a wheel 105, numbered peripherally in the same manner as the wheel 93, being employed to indicate the tens in dollars of the gross amount. Secured to the wheel 105 are ratchets 106 and 107, identical with the ratchets 94 and 95. A circular partition 108, like the partition 98 and provided in a similar manner with a groove 109 at its top, is interposed between the ratchet 107 and wheel 93. The wheel 93 is provided with two spring-actuated pawls like the pawl 102, which travel on the periphery and are situated diametrically opposite each other, said pawls alternately engaging the ratchet 107 and moving the wheel 105 the distance of two teeth on said ratchet for each complete revolution of the wheel 93. A sleeve 110 on the shaft-section 86 bears a wheel 111, numbered peripherally like the wheels 93 and 105, said wheel 111 being employed to indicate the hundreds in dollars of the gross amount of sales. Two ratchets 112 and 113 are secured to the wheel 111 in the same manner and of the same construction as on the other wheels of the adding device. A circular partition 114 separates said ratchets from the wheel 105, which bears two spring-actuated pawls 102 for alternately entering a groove 109 in said partition, and thereby moving the wheel 111 the distance of two teeth in the ratchet 113 for each complete revolution of the wheel 105. Flat tension-springs 115 are secured to a longitudinally arranged bar 116, supported by arms 117, secured to the standards 81. The free end of each spring engages an oval-toothed ratchet 94, 107, or 112, their purpose being to prevent the indicating-wheels from being rotated more than one tooth at a time. The cover or cap 90 is hinged and provided with slots 89 to expose a number on each indicating-wheel as it revolves, the number of teeth in all the ratchet-wheels of the adding mechanism corresponding with the number in the toothed flange 24 on the main shaft—in the present instance being twenty.

The operation of the adding device is as follows: The knob d of the shaft being turned from left to right to indicate the cents of a sale, the beveled gear 83 will cause the shaft-section 85 to rotate from right to left a corresponding distance, carrying with it the wheel 88, and expose the same numeral in the slot 89 of the cover 90 as the index-finger points to on the dial C. When cents to the amount of one dollar have been indicated on the dial C, the wheel 88 will have completed a whole revolution, and its pawl 102 will be forced by the spring 103 into the slot 101 in the partition 98, engaging a tooth on the ratchet-wheel 95 and carrying said wheel forward one space. The numbered wheel 93, being secured to the ratchet-wheel 95, is moved a corresponding distance and exposes the figure 1 in its cover-slot 89, a naught being at the same time displayed in the slot of the wheel 88, thus indicating at a glance that the gross amount registered is one dollar. When the shaft F is turned to indicate dollars on the dial B, as described, it rotates the shaft-section 86 of the adding device from left to right a corresponding distance. The ratchet 92, being secured to said shaft-section in engagement with the pawl 97, which is pivoted on the ratchet-wheel 95, causes the indicating-wheel 93 to move a like distance, and thus display a number in its cover-slot equal to the number pointed on the dial B plus the number previously exposed in said slot, if any, through the action of the wheel 88 thereon. As described, the wheels 93, 105, and 111 are each supplied peripherally with two sets of numerals from naught to nine arranged consecutively. The pawls 102 on the wheels 93 and 105 are disposed opposite the naughts. After the wheel 93 has been rotated to expose the figure 9 in its cover-slot, at its next movement a naught would appear and a pawl 102 on said wheel engage the ratchet-wheel 109, moving it the space of one tooth and carrying the indicating-wheel 105 a corresponding distance, or so that the figure 1 would be exposed in its cover-slot. The device would now show, providing that the shaft G has meanwhile remained stationary, that the dials B C had been employed to indicate sales amounting to ten dollars, the figure 1 appearing on the wheel 105, a zero on wheel 93, and a zero on wheel 88. At a half-revolution of the wheel 105, which shows the tens in dollars, one of its pawls 102 moves the wheel 111, it being at this point that the gross amount has reached one hundred dollars. The retaining-springs 115, in engagement with the oval toothed ratchets 95, 107, and 113, prevent the momentum imparted by the several pawls from moving the indicating-wheels more than one tooth at a time.

The purpose of supplying the wheels 93, 105, and 111, respectively, with two sets of cardinal numbers and two pawls for actuating the adjacent indicating-wheel, as described, is to prevent the use of double numbers from nine to twenty on said wheels, the result being the same mechanically as when double columns of figures are added mentally, a unit being added to the adjacent left-hand column for every ten units in the addition of the right-hand column in a manner that will be readily understood without a more explicit description.

As displayed in Fig. 1, the adding mechanism indicates the gross amount of the sales as two hundred and forty-five dollars and ten cents, ($245.10.)

By subdividing the spaces on the dial C and wheel 88 to correspond therewith and increasing the number of teeth in the gear 22 and beveled gears 82 to one hundred it will readily be seen that the apparatus may be employed to indicate sales in cents under five.

The device described can readily be adjusted to work equally as well with indicating-dials constructed on a semicircle instead of a circle as illustrated, the wheels of the adding mechanism conforming thereto.

Having thus explained my invention, what I claim is—

1. In a cash-register, the combination, with a sliding shaft provided with a bunter and a toothed flange, of a sliding bar, as 33, provided with upright arms projecting into the path of the bunter on opposite sides thereof and with a stop-arm for engaging the toothed flange when said shaft is pushed inward to open the money-drawer.

2. In a cash-register, a pivoted rod, as 56, provided with an arm projecting into the path of a bunter on the indicator-shaft, whereby it is prevented from being pushed inward to open the drawer, and a pivoted plate on the opposite end of said rod in position to be engaged by a pin on said shaft when revolved, whereby said arm is removed from the path of said bunter, substantially as described.

3. In a cash-register, the pivoted rod 56, provided with the arm 68, projecting into the path of a bunter on the indicator-shaft, and a pivoted plate 59, adapted to be engaged by a pin on said shaft when rotated, in combination with the lever 61, having the latch 64, for securing said rod when depressed, and the spring 70, for returning it when released from said latch, substantially as described.

4. In a cash-register, the combination of an indicator-shaft, a bunter on said shaft, a toothed flange on said shaft, a pivoted lever provided with a stud in the path of the bunter and with a lever-arm for engaging said flange, and a spring for disengaging said lever when released from the bunter.

5. In a cash-register, a case provided with two dials for respectively indicating the dollars and cents of a sale, a sectional shaft passing centrally through each dial, a sleeve on each shaft-section provided with a crown-gear, said gears intermeshing to form a separable clutch, an index-finger and grooved ring on each forward sleeve, a chain winding onto said sleeves as the shafts are rotated, a spring connecting each chain with the case, and a horizontal bar pivoted within the case, the ends of said bar projecting into the grooves of said rings, whereby said clutches may be simultaneously separated when either of said forward shaft-sections is pulled outward, substantially as described.

6. In a cash-register of the character described, an adding device comprising a sectional shaft and indicator-shafts, one section of which bears a wheel numbered peripherally to correspond with the numbers on the cent-dial of the register and the other section bearing wheels each provided peripherally with two sets of cardinal numbers arranged consecutively and adapted to display the gross amount of dollars which have been indicated on the dials, substantially as described.

7. In a cash-register, an adding device comprising a sectional shaft actuated by the indicator-shafts, a series of wheels on said shaft, one of which is provided with numerals corresponding with those on the cent-dial of the register and the remaining wheels provided, respectively, with two sets of cardinal numbers arranged consecutively, a cover for said wheels provided with slots for exposing a single number thereon, and connecting mechanism, substantially as described, whereby said wheels are so rotated that the numbers displayed in said slot represent the gross amount indicated on said dials.

8. An adding device for cash-registers, comprising a sectional shaft, one section of which is actuated by the indicator-shaft of the dollar-dial, a series of wheels on said shaft-section provided, respectively, with two sets of cardinal numbers, a ratchet on said shaft-section for actuating one of said wheels conjointly with said indicator-shaft, ratchets secured to the succeeding wheels of the series, and diametrical pallets on said wheels for engaging the ratchet of the succeeding wheel at each semi-revolution and advancing said wheel one numeral, substantially as and for the purpose set forth.

9. In an adding device for cash-registers, a sectional shaft, one section of which bears a wheel numbered to correspond with the cent-dial of the register and is actuated by the indicator-shaft thereof, and the other section bearing a series of wheels provided, respectively, with two sets of cardinal numbers, said section being actuated by the indicator-shaft of the dollar-dial, a ratchet secured to each wheel, the number of teeth in said ratchets corresponding with the spaces on said dials, fixed circular partitions separating said wheels and provided with a groove at their tops, a pawl pivoted to said cent-wheel, said pawl being adapted to enter the groove on the adjacent partition and move a dollar-wheel one space at every complete revolution, diametric pallets on the dollar-wheels for entering grooves in their adjacent partitions and moving the next wheel one space for each semi-revolution, and a cover for said device provided with slots for exposing a numeral on each wheel, whereby the sum total of the amounts which have been indicated on the dials will be displayed, substantially as described.

10. In a cash-register, the adding device K, comprising the sectional shaft 80, the wheel 88, secured to the section 85 thereof and numbered peripherally to correspond with the cent-dial of the register, the sleeve 91 on the section 86, provided with the ratchet 92, the wheel 93 on said sleeve, provided peripherally with two sets of cardinal numbers and the ratchet-wheel 95, the wheels 105 and 111, provided, respectively, with two sets of cardinal numbers and the ratchets 107 and 113, the pawl 97 on the ratchet 95, the partitions 98, 99, and 114, separating said wheels and having the grooves 101, and the pallets 102, for actuating adjacent wheels, all being arranged to operate substantially as described.

11. In an adding device for cash-registers, the cent-wheel 88, secured to the shaft-section 85 and provided with the pallet 102, in combination with the dollar wheel 93, fitted to revolve on the shaft-section 86 and provided with the ratchet 95, and the partition 98, having the groove 101, whereby said pallet may be made to engage a tooth of said ratchet at each revolution of the cent-wheel, substantially as described.

12. In a cash-register, the combination of a case provided with a money-drawer, dials for indicating the dollars and cents of a sale, shafts passing centrally through said dials and provided with knobs and index-fingers, mechanism, substantially as described, disposed on said shafts for returning the index-fingers to the naught-point when said knobs are withdrawn, adjunctive mechanism actuated by said shafts for forcing out said drawer when the knobs are forced inward, a stop for preventing the drawer from being opened until a shaft is rotated, a stop for preventing the shafts from being rotated while being withdrawn, and an adding mechanism actuated by said shafts, whereby the sum total of the amounts indicated by the fingers thereon may be displayed, substantially as described.

13. In a cash-register, the sliding bar 33, provided with the arms 37 and 38, a bunter on the indicating-shaft between said arms, and the arm 36, also on said bar and adapted to engage the teeth of a flange on said shaft when pushed inward, whereby it is prevented from being rotated, substantially as described.

14. In a cash-register, the shaft F, comprising the sections $q$ $v$, the sleeve $m$ on the section $q$ bearing the index-finger $f$ and gear $p$, the sleeve $r$, fitted to slide on the section $v$ and pinned to the section $q$, the sleeve 15, inclosing the sleeve $r$ and pinned to the section $v$, the gear 18 on said sleeve intermeshing with the gear $p$, the spring 21 on the sleeve $m$, and the bunter 28 on the sleeve $r$, for actuating an adjunctive drawer-releasing mechanism, all being arranged to operate substantially as described.

15. In a cash-register of the character described, an adding device comprising a series of wheels disposed on a sectional shaft actuated by the indicator-shafts of the register, one of said wheels being numbered peripherally to display the cents of the gross amount registered, and the succeeding wheels provided with numerals adapted to display the dollars of the gross amount registered as said wheels are consecutively rotated by their connecting mechanism, substantially as described.

HARMON A. MILES.

Witnesses:
O. M. SHAW,
K. DURFEE.